United States Patent
Ha

(10) Patent No.: US 12,418,038 B2
(45) Date of Patent: Sep. 16, 2025

(54) FUEL CELL SYSTEM FOR VEHICLE AND AIR SUPPLY DEVICE

(71) Applicants: Hyundai Motor Company, Seoul (KR); Kia Corporation, Seoul (KR)

(72) Inventor: Kyoung Ku Ha, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 551 days.

(21) Appl. No.: 17/892,062

(22) Filed: Aug. 20, 2022

(65) Prior Publication Data

US 2023/0327152 A1    Oct. 12, 2023

(30) Foreign Application Priority Data

Apr. 8, 2022    (KR) .................. 10-2022-0044127

(51) Int. Cl.
*H01M 8/04082*    (2016.01)
(52) U.S. Cl.
CPC .... *H01M 8/04201* (2013.01); *H01M 2250/20* (2013.01)
(58) Field of Classification Search
CPC ......... H01M 8/04201; H01M 8/04089; H01M 8/04; H01M 2250/20; B60K 11/06; B60K 11/08; B60K 11/085
See application file for complete search history.

(56) References Cited

U.S. PATENT DOCUMENTS

| | | | |
|---|---|---|---|
| 8,986,901 B2 * | 3/2015 | Katano | H01M 8/04 429/444 |
| 9,017,896 B2 * | 4/2015 | Matsumoto | B60L 58/33 429/482 |
| 2009/0017745 A1 * | 1/2009 | Kum | H01M 8/04089 454/156 |

FOREIGN PATENT DOCUMENTS

| | | |
|---|---|---|
| JP | 2007-294287 A | 11/2007 |
| KR | 10-2016-0039863 A | 4/2016 |

* cited by examiner

*Primary Examiner* — John D Walters
(74) *Attorney, Agent, or Firm* — Fox Rothschild LLP

(57) ABSTRACT

Provided is a fuel cell system for a vehicle, the fuel cell system including a fuel cell stack provided in a vehicle, an air duct including an air inflow path through which air is introduced, and an air outflow path through which the air is discharged to the fuel cell stack, and an air inlet/outlet flow path having one end connected to the air duct and the other end exposed to the outside of the air duct, the air inlet/outlet flow path being configured to allow the air to selectively enter or exit the air duct depending on an operation of the fuel cell stack, thereby obtaining an advantageous effect of improving safety, reliability, operational efficiency, and durability by inhibiting unnecessary surplus power generation of the fuel cell stack.

18 Claims, 7 Drawing Sheets

FUEL CELL SYSTEM FOR VEHICLE AND AIR SUPPLY DEVICE

CROSS-REFERENCE TO RELATED APPLICATION

This application is based on and claims under 35 U.S.C. § 119(a) the benefit of Korean Patent Application No. 10-2022-0044127 filed in the Korean Intellectual Property Office on Apr. 8, 2022, the entire contents of which are incorporated herein by reference.

TECHNICAL FIELD

Embodiments of the present disclosure relate to a fuel cell system for a vehicle and an air supply device, and more particularly, to a fuel cell system for a vehicle and an air supply device, which are capable of improving safety, reliability, and operational efficiency.

BACKGROUND ART

A fuel cell electric vehicle (FCEV) produces electrical energy from an electrochemical reaction between oxygen and hydrogen in a fuel cell stack and travels by operating a motor.

The fuel cell electric vehicle may continuously generate electricity, regardless of a capacity of a battery, by being supplied with fuel (hydrogen) and air from the outside, and thus has high efficiency, and emits almost no contaminant. By virtue of these advantages, continuous research and development is being conducted on the fuel cell electric vehicle.

In general, the fuel cell electric vehicle may include a fuel cell stack configured to generate electricity by means of an oxidation-reduction reaction between hydrogen and oxygen, a fuel supply device configured to supply fuel (hydrogen) to the fuel cell stack, and an air supply device configured to supply the fuel cell stack with reaction air (oxygen) which is an oxidant required for an electrochemical reaction.

Meanwhile, when the fuel cell electric vehicle travels by inertia (coasts), the motor does not need to operate, and thus the operation (power generation operation) of the fuel cell stack needs to be stopped, which is advantageous in durability and system efficiency.

That is, if the fuel cell stack operates even in a situation in which the production of electricity is unnecessary, durability and efficiency of the fuel cell stack may deteriorate, and a separate treatment device for treating unnecessary surplus electric power produced by the fuel cell stack needs to be additionally provided.

However, in the related art, there is a problem in that, even in the situation in which the operation of the fuel cell stack is unnecessary while the fuel cell electric vehicle travels by inertia, the fuel cell stack operates as vehicle-induced wind is introduced into an air duct (intake duct) and supplied to the fuel cell stack.

In the related art, as a solution for preventing malfunction of the fuel cell stack caused by the inflow of the vehicle-induced wind while the fuel cell electric vehicle travels by inertia, there has been proposed a method in which an air shut-off device is used to inhibit air from being supplied to the fuel cell stack while the fuel cell electric vehicle travels by inertia (a valve disc of the air shut-off device blocks an air flow path through which air is supplied to the fuel cell stack).

That is, the valve disc of the air shut-off device may open the air flow path while the fuel cell electric vehicle travels normally (in a state in which the motor needs to operate), whereas the valve disc may close the air flow path while the fuel cell electric vehicle travels by inertia.

However, in the related art, there is a problem in that when the traveling condition of the fuel cell electric vehicle changes from the inertia traveling to the normal traveling (in the state in which the motor operates), a supply of air to the fuel cell stack is delayed by an operating time of the air shut-off device (the time required for the valve disc to open or close the air flow path) even in a situation in which air needs to be quickly supplied to the fuel cell stack.

Therefore, recently, various studies have been conducted to inhibit malfunction of the fuel cell stack caused by the inflow of the vehicle-induced wind and quickly supply air to the fuel cell stack when the traveling condition of the fuel cell electric vehicle is changed, but the study results are still insufficient. Accordingly, there is a need to develop a technology to inhibit malfunction of the fuel cell stack caused by the inflow of the vehicle-induced wind and quickly supply air to the fuel cell stack when the traveling condition of the fuel cell electric vehicle is changed.

SUMMARY

The present disclosure has been made in an effort to provide a fuel cell system for a vehicle and an air supply device, which are capable of improving safety, reliability, and operational efficiency.

The present disclosure has also been made in an effort to inhibit surplus power generation and malfunction of a fuel cell stack caused by an inflow of vehicle-induced wind.

The present disclosure has also been made in an effort to improve durability, efficiency, safety, and reliability of a fuel cell stack.

The present disclosure has also been made in an effort to quickly supply air to a fuel cell stack when a traveling condition of a fuel cell electric vehicle is changed.

The objects to be achieved by the embodiments are not limited to the above-mentioned objects, but also include objects or effects that may be understood from the solutions or embodiments described below.

An exemplary embodiment of the present disclosure provides a fuel cell system for a vehicle, the fuel cell system including: a fuel cell stack provided in a vehicle; an air duct including an air inflow path through which air is introduced, and an air outflow path through which the air is discharged to the fuel cell stack; and an air inlet/outlet flow path having one end connected to the air duct and the other end exposed to the outside of the air duct, the air inlet/outlet flow path being configured to allow the air to selectively enter or exit the air duct depending on an operation of the fuel cell stack.

This is to inhibit malfunction of the fuel cell stack caused by an inflow of vehicle-induced wind and improve safety and reliability of the fuel cell stack.

That is, there is a problem in that, even in the situation in which the operation of the fuel cell stack is unnecessary while the fuel cell electric vehicle travels by inertia, the fuel cell stack operates as vehicle-induced wind is introduced into an air duct (intake duct) and supplied to the fuel cell stack.

In the related art, as a solution for preventing malfunction of the fuel cell stack caused by the inflow of the vehicle-induced wind while the fuel cell electric vehicle travels by inertia, there has been proposed a method in which an air shut-off device is used to inhibit air from being supplied to the fuel cell stack while the fuel cell electric vehicle travels by inertia. However, in the related art, there is a problem in that when the traveling condition of the fuel cell electric vehicle changes from the inertia traveling to the normal traveling, a supply of air to the fuel cell stack is delayed by an operating time of the air shut-off device even in a situation in which air needs to be quickly supplied to the fuel cell stack.

In contrast, according to the embodiment of the present disclosure, air may selectively enter or exit the air duct through the air inlet/outlet flow path connected to the air duct. Therefore, it is possible to obtain an advantageous effect of inhibiting surplus power generation and malfunction of the fuel cell stack caused by the inflow of the vehicle-induced wind when the vehicle travels by inertia and the operation of the fuel cell stack is stopped. Further, it is possible to obtain an advantageous effect of improving durability and efficiency of the fuel cell stack.

Moreover, according to the embodiment of the present disclosure, it is possible to inhibit the supply of air to the fuel cell stack even though the air flow path is not opened or closed by a valve. Therefore, it is possible to obtain an advantageous effect of quickly supplying air to the fuel cell stack without delaying the supply of air when the traveling condition of the fuel cell electric vehicle is changed (inertial traveling→normal traveling).

In addition, according to the embodiment of the present disclosure, the air may be additionally introduced into the air duct through the air inlet/outlet flow path separately from the air being introduced into the air inflow path. Therefore, a sufficient air suction area may be ensured when the fuel cell electric vehicle travels normally. Therefore, it is possible to obtain an advantageous effect of reducing air intake differential pressure and further improving air intake efficiency.

According to the exemplary embodiment of the present disclosure, when the vehicle travels by inertia and the operation of the fuel cell stack is stopped, the air inlet/outlet flow path may discharge the air introduced through the air inflow path to the outside of the air duct, and when the vehicle normally travels and the fuel cell stack operates, the air inlet/outlet flow path may introduce the air into the air duct from the outside of the air duct.

According to the exemplary embodiment of the present disclosure, the air outflow path may be configured to have a first differential pressure, and the air inlet/outlet flow path may be configured to have a second differential pressure lower than the first differential pressure.

This is based on the fact that a flow rate of air passing through multiple flow paths is inversely proportional to a differential pressure. Since the second differential pressure of the air inlet/outlet flow path is lower than the first differential pressure of the air outflow path, a flow rate of the air which is introduced into the air duct and then passes through the air outflow path may be significantly lower than a flow rate of the air which is introduced into the air duct and then passes through the air inlet/outlet flow path. As a result, most of the air introduced into the air duct through the air inflow path may be discharged through the air inlet/outlet flow path.

According to the exemplary embodiment of the present disclosure, the fuel cell system may include a filter member disposed between the air inflow path and the air outflow path and configured to filter air to be discharged to the air outflow path.

Since the air to be discharged to the air outflow path is filtered by the filter member as described above, it is possible to obtain an advantageous effect of minimizing the amount of foreign substances such as dust entering the fuel cell stack.

The air inlet/outlet flow path may be connected to various positions on the air duct in accordance with required conditions and design specifications.

According to the exemplary embodiment of the present disclosure, the air inlet/outlet flow path may be provided at an upstream side from the filter member.

This is based on the fact that the differential pressure at the upstream side from the filter member is relatively lower than the differential pressure at the downstream side from the filter member where the air outflow path (fuel cell stack) is connected. Since the air inlet/outlet flow path is disposed at the upstream side from the filter member, it is possible to obtain an advantageous effect of further improving performance in allowing the air to flow through the air inlet/outlet flow path while bypassing the air outflow path (further improving discharge performance). Further, it is possible to obtain an advantageous effect of minimizing the amount of air to be supplied to the fuel cell stack via the air outflow path.

According to the exemplary embodiment of the present disclosure, the air inlet/outlet flow path may be disposed to face the air inflow path.

Since the air inlet/outlet flow path is disposed coaxially with the air inflow path as described above, the air introduced through the air inflow path may more effectively enter the air inlet/outlet flow path. Therefore, it is possible to obtain an advantageous effect of further improving the performance in allowing the air to flow through the air inlet/outlet flow path while bypassing the air outflow path (further improving discharge performance).

In particular, the air inlet/outlet flow path may be disposed coaxially with the air inflow path. Since the air inlet/outlet flow path is disposed coaxially with the air inflow path as described above, most of the air introduced through the air inflow path may immediately enter the air inlet/outlet flow path without coming into contact with an inner surface of the air duct. Therefore, it is possible to obtain an advantageous effect of further improving the performance in allowing the air to flow through the air inlet/outlet flow path while bypassing the air outflow path (further improving discharge performance).

According to the exemplary embodiment of the present disclosure, the air supply device may include an air guide disposed at an end of the air inlet/outlet flow path exposed into the air duct, the air guide being disposed in the air duct and configured to guide the air to the air inlet/outlet flow path.

The air guide may have various structures capable of guiding the air, which is introduced into the air duct through the air inflow path, to the air inlet/outlet flow path.

For example, the air guide may have a larger cross-sectional area than the air inlet/outlet flow path.

Since the air guide is provided at the end of the air inlet/outlet flow path as described above, the air in the air duct may be more effectively concentrated into the air inlet/outlet flow path. Therefore, it is possible to obtain an advantageous effect of further improving the performance in allowing the air to flow through the air inlet/outlet flow path while bypassing the air outflow path (further improving discharge performance).

According to the exemplary embodiment of the present disclosure, the air inlet/outlet flow path may be connected to the air inflow path.

According to the exemplary embodiment of the present disclosure, an outlet of the air inlet/outlet flow path may be directed toward a lateral or rear side of the vehicle.

Another exemplary embodiment of the present disclosure provides an air supply device, which is configured to supply air to a fuel cell stack of a vehicle, the air supply device including: an air duct including an air inflow path through which the air is introduced, and an air outflow path through which the air is discharged to the fuel cell stack; and an air inlet/outlet flow path having one end connected to the air duct and the other end exposed to the outside of the air duct, the air inlet/outlet flow path being configured to allow the air to selectively enter or exit the air duct depending on an operation of the fuel cell stack.

According to the exemplary embodiment of the present disclosure, when the vehicle travels by inertia and the operation of the fuel cell stack is stopped, the air inlet/outlet flow path may discharge the air introduced through the air inflow path to the outside of the air duct, and when the vehicle normally travels and the fuel cell stack operates, the air inlet/outlet flow path may introduce the air into the air duct from the outside of the air duct.

According to the exemplary embodiment of the present disclosure, the air outflow path may be configured to have a first differential pressure, and the air inlet/outlet flow path may be configured to have a second differential pressure lower than the first differential pressure.

According to the exemplary embodiment of the present disclosure, the air supply device may include an air guide disposed at an end of the air inlet/outlet flow path exposed into the air duct, the air guide being disposed in the air duct and configured to guide the air to the air inlet/outlet flow path.

According to the exemplary embodiment of the present disclosure, the air guide may have a larger cross-sectional area than the air inlet/outlet flow path.

According to the exemplary embodiment of the present disclosure, the air supply device may include a filter member disposed between the air inflow path and the air outflow path and configured to filter air.

According to the exemplary embodiment of the present disclosure, the air inlet/outlet flow path may be provided at an upstream side from the filter member.

According to the exemplary embodiment of the present disclosure, the air inlet/outlet flow path may be disposed to face the air inflow path.

According to the exemplary embodiment of the present disclosure, the air inlet/outlet flow path may be connected to the air inflow path.

According to the exemplary embodiment of the present disclosure, an outlet of the air inlet/outlet flow path may be directed toward a lateral or rear side of the vehicle.

In another embodiment, vehicles are provided that comprise an apparatus as disclosed herein.

DETAILED DESCRIPTION

Figure 1:
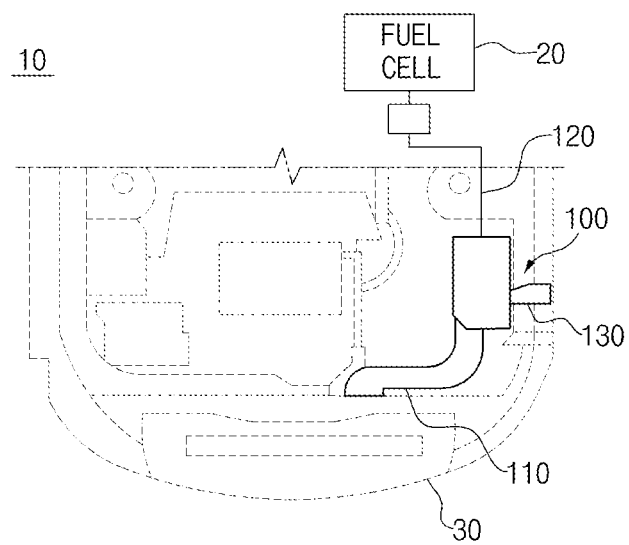
FIG. 1 is a view for explaining a fuel cell system for a vehicle according to an exemplary embodiment of the present disclosure.
Figure 2:
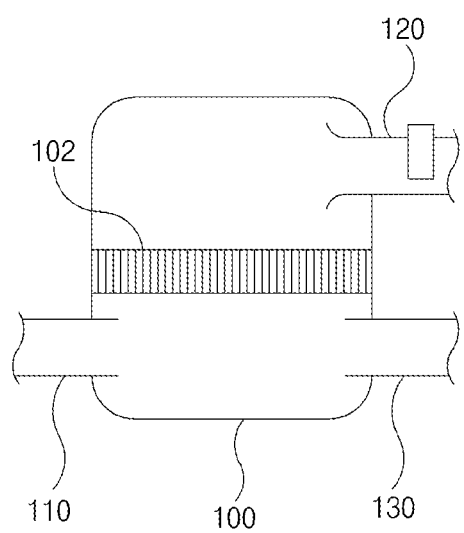
FIG. 2 is a view for explaining an air supply device according to the embodiment of the present disclosure.

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Referring to FIGS. 1 to 7, a fuel cell system 10 for a vehicle according to an exemplary embodiment of the present disclosure includes a fuel cell stack 20 provided in a vehicle 30, and an air supply device including an air duct 100 and an air inlet/outlet flow path 130.

For reference, the fuel cell system 10 for a vehicle according to the embodiment of the present disclosure may be applied to various fuel cell electric vehicles 30 (e.g., passenger vehicles or commercial vehicles), ships, mobility vehicles in aerospace fields, or the like to which the fuel cell stack 20 may be applied. The present disclosure is not restricted or limited by the types and properties of the target objects to which the fuel cell system 10 for a vehicle is applied.

The fuel cell stack 20 may refer to a kind of power generation device that generates electrical energy through a chemical reaction of fuel (e.g., hydrogen). The fuel cell stack may be configured by stacking several tens or hundreds of fuel cells (unit cells) (not illustrated) in series.

The fuel cell may have various structures capable of producing electricity by means of an oxidation-reduction reaction between fuel (e.g., hydrogen) and an oxidant (e.g., air).

For example, the fuel cell may include: a membrane electrode assembly (MEA) (not illustrated) having catalyst electrode layers in which electrochemical reactions occur and which are attached to two opposite sides of an electrolyte membrane through which hydrogen ions move; a gas diffusion layer (GDL) (not illustrated) configured to uniformly distribute reactant gases and transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

More specifically, in the fuel cell, hydrogen, which is fuel, and air (oxygen), which is an oxidant, may be supplied to an anode and a cathode of the membrane electrode assembly, respectively, through flow paths in the separator, such that the hydrogen is supplied to the anode, and the air is supplied to the cathode.

The hydrogen supplied to the anode may be decomposed into hydrogen ions (protons) and electrons by catalysts in the electrode layers provided at two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons transmitted through the separator may meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

The air supply device may serve to supply air to the fuel cell stack 20.

More specifically, the air supply device may include: the air duct 100 including an air inflow path 110 through which air is introduced, and an air outflow path 120 through which air is discharged to the fuel cell stack 20; and the air inlet/outlet flow path 130 having one end connected to the air duct 100 and the other end exposed to the outside of the air duct 100, the air inlet/outlet flow path 130 being configured to allow the air to selectively enter or exit the air duct 100 depending on an operation of the fuel cell stack 20.

The air duct 100 may have various structures having the air inflow path 110 through which air is introduced and the air outflow path 120 through which air is discharged to the fuel cell stack 20. The present disclosure is not restricted or limited by the structure of the air duct 100.

For example, the air duct 100 may have a box shape having a predetermined space therein. The air inflow path 110 through which air is introduced from the outside may be provided at one side (e.g., a left lower end based on FIG. 2) of the air duct 100. The air outflow path 120 through which the air introduced into the air duct 100 is discharged to the fuel cell stack 20 may be provided at the other side (e.g., a right upper end based on FIG. 2) of the air duct 100.

The air inflow path 110 may have various structures capable of guiding the outside air (e.g., air outside the vehicle) to the air duct 100. The present disclosure is not restricted or limited by the structure and shape of the air inflow path 110.

One end (inlet end) of the air inflow path 110 may be exposed to the outside of the air duct 100 so that outside air may be introduced into the air inflow path 110. The other end (outlet end) of the air inflow path 110 may be connected to and communicate with the air duct 100.

For example, the air inflow path 110 may be formed in an approximately "L" shape. The inlet end of the air inflow path 110 may be disposed to be directed toward a front side of the vehicle 30 based on a direction in which the vehicle 30 travels.

According to another embodiment of the present disclosure, the air inflow path may be formed in a straight shape, an "S" shape, a "C" shape, or other shapes. Alternatively, the inlet end of the air inflow path may be directed toward a lateral side of the vehicle or directed in other directions, instead of being directed toward the front side of the vehicle.

The air outflow path 120 may have various structures capable of connecting the air duct 100 and the fuel cell stack 20. The present disclosure is not restricted or limited by the structure and shape of the air outflow path 120.

For example, the air outflow path 120 may be formed in a curved shape (e.g., an "L" shape or an "S" shape). One end of the air outflow path 120 may be connected to the air duct 100, and the other end of the air outflow path 120 may be connected to the fuel cell stack 20.

In this case, the configuration in which the other end of the air outflow path 120 may be connected to the fuel cell stack 20 is understood as a case in which the other end of the air outflow path 120 is connected directly to the fuel cell stack 20 or a case in which the other end of the air outflow path 120 is connected to the fuel cell stack 20 via a separate air supply line (connection flow path) (not illustrated). An air compressor, an air cooler, a humidifier, and the like may be provided in the air supply line.

According to another embodiment of the present disclosure, the air outflow path may be formed in a straight shape or other shapes.

A direction of an outlet of the air outflow path 120 may be variously changed in accordance with required conditions and design specifications. For example, an outlet of the air inlet/outlet flow path 130 may be defined as being directed toward a lateral side of the vehicle with respect to the direction in which the vehicle 30 travels.

According to the exemplary embodiment of the present disclosure, the air supply device may include a filter member 102 disposed between the air inflow path 110 and the air outflow path 120 and configured to filter the air to be discharged to the air outflow path 120 (the air to be introduced into the fuel cell stack).

In this case, the configuration in which the air to be discharged to the air outflow path 120 is filtered may mean a configuration in which the filter member 102 filters out foreign substances such as dust contained in the air.

A typical dry filter or a typical paper filter (e.g., an air filter) may be used as the filter member 102. The present disclosure is not restricted or limited by the material and type of the filter member 102.

Since the air to be discharged to the air outflow path 120 (the air to be introduced into the fuel cell stack) is filtered by the filter member 102 as described above, it is possible to obtain an advantageous effect of minimizing the amount of foreign substances such as dust entering the fuel cell stack 20.

The air inlet/outlet flow path 130 may serve to allow the air introduced into the air duct 100 to bypass the air outflow path 120 (to discharge the air introduced into the air duct 100 to the outside of the air duct 100). Alternatively, the air inlet/outlet flow path 130 serves to additionally introduce outside air into the air duct 100 separately from the air being introduced into the air inflow path 110.

More specifically, one end of the air inlet/outlet flow path 130 may be connected to and communicates with the air duct 100, and the other end of the air inlet/outlet flow path 130 may be disposed to be exposed to the outside of the air duct 100. The air inlet/outlet flow path 130 is configured to allow the air selectively to enter or exit the air duct 100 through the air inlet/outlet flow path 130 depending on the operation of the fuel cell stack 20.

In this case, the configuration in which the air enters or exits the air duct 100 through the air inlet/outlet flow path 130 may include a case in which the outside air outside the air duct 100 enters the air duct 100 through the air inlet/outlet flow path 130 or a case in which the air in the air duct 100 (the air introduced into the air duct 100 through the air inflow path) is discharged to the outside of the air duct 100 through the air inlet/outlet flow path 130 (bypasses the air outflow path 120).

Figure 3:
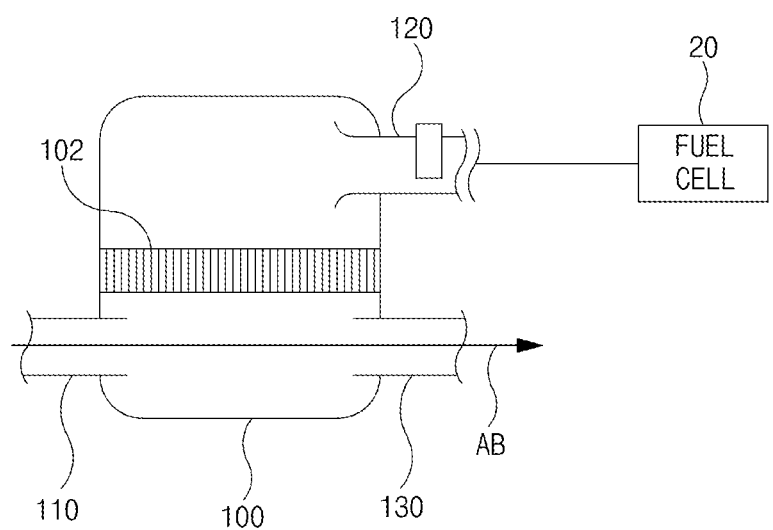
FIG. 3 is a view for explaining a bypass state of air in the fuel cell system for a vehicle according to the embodiment of the present disclosure.
Figure 4:
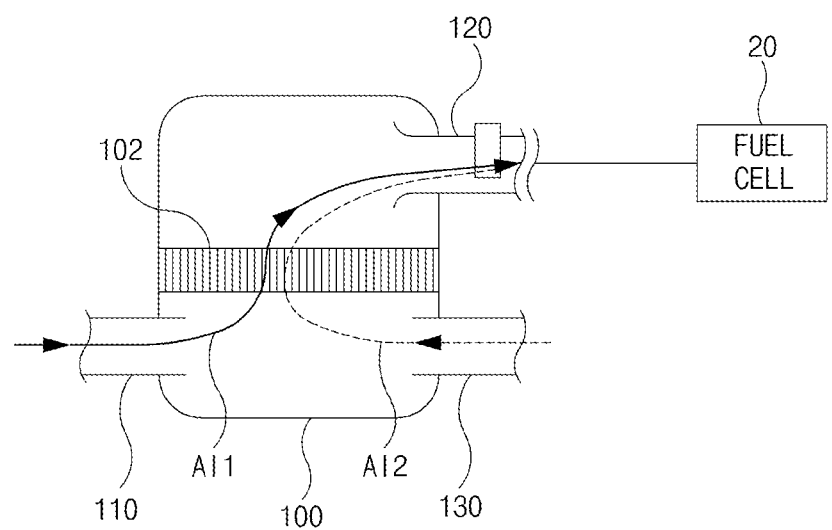
FIG. 4 is a view for explaining a supply state of air in the fuel cell system for a vehicle according to the embodiment of the present disclosure.

According to the exemplary embodiment of the present disclosure, the air inlet/outlet flow path 130 may be configured to allow the air introduced through the air inflow path 110 to be discharged to the outside of the air duct 100 when the vehicle 30 travels by inertia and the operation of the fuel cell stack 20 is stopped (see FIG. 3). The air inlet/outlet flow path 130 may be configured to allow the air outside the air duct 100 to enter the air duct 100 when the vehicle 30 normally operates and the fuel cell stack 20 operates (see FIG. 4).

For reference, in the embodiment of the present disclosure, the inertial traveling (coasting) of the vehicle 30 may refer to a traveling state in which a traveling speed of the vehicle 30 may be kept constant without driving power generated by the motor. Since the motor does not operate during the inertial traveling of the vehicle 30, the operation of the fuel cell stack 20 may be stopped. For example, a traveling speed of the vehicle 30 may be kept constant even though the motor does not operate (the operation of the fuel cell stack is stopped) when the vehicle travels on a downward slope.

In contrast, in the embodiment of the present disclosure, the normal traveling of the vehicle 30 may refer to a state in which the vehicle 30 is driven by driving power generated by the motor. The operating state of the fuel cell stack 20 may be continuously maintained when the vehicle 30 travels normally.

This is based on the fact that the fuel cell stack 20 may unnecessarily operate when vehicle-induced wind introduced into the air duct 100 is supplied to the fuel cell stack 20 even in a situation in which the operation of the fuel cell stack 20 is unnecessary while the fuel cell electric vehicle 30 travels by inertia.

In contrast, according to the embodiment of the present disclosure, the air may selectively enter or exit the air duct 100 through the air inlet/outlet flow path 130 connected to the air duct 100. Therefore, when the vehicle 30 travels by inertia and the operation of the fuel cell stack 20 is stopped, the air introduced into the air duct 100 is not supplied to the fuel cell stack 20 but may be mostly discharged to the outside of the air duct 100 through the air inlet/outlet flow path 130 (bypass the air outflow path 120) (see AB in FIG. 3). Therefore, it is possible to obtain an advantageous effect of improving durability and efficiency of the fuel cell stack 20 and minimizing malfunction of the fuel cell stack 20 caused by the supply of unnecessary air to the fuel cell stack 20 (the inflow of vehicle-induced wind).

In addition, according to the embodiment of the present disclosure, the air may be additionally introduced into the air duct 100 through the air inlet/outlet flow path 130 separately from the air being introduced into the air inflow path 110.

That is, when the fuel cell stack 20 operates, the air compressor (not illustrated) provided in the air outflow path 120 (or the air supply line connecting the air outflow path and the fuel cell stack) operates, such that a suction pressure may be applied to the air outflow path 120 (the interior of the air duct). The air outside the air duct 100 may be sucked by the suction pressure into the air duct 100 through the air inlet/outlet flow path 130.

As described above, according to the embodiment of the present disclosure, when the fuel cell stack 20 operates, air may be sucked through the air inflow path 110 (see A11 in FIG. 4), and at the same time, air may be sucked through the air inlet/outlet flow path 130 (see A12 in FIG. 4), such that a sufficient air suction area is ensured. Therefore, it is possible to obtain an advantageous effect of reducing air intake differential pressure and further improving air intake efficiency.

In particular, the air outflow path 120 may be configured to have a first differential pressure, and the air inlet/outlet flow path 130 may be configured to have a second differential pressure lower than the first differential pressure.

This is based on the fact that a flow rate of air passing through multiple flow paths is inversely proportional to a differential pressure. Since the second differential pressure of the air inlet/outlet flow path 130 is lower than the first differential pressure of the air outflow path 120, a flow rate (first flow rate) of the air which is introduced into the air duct 100 and then passes through (discharged through) the air outflow path 120 may be significantly lower than a flow rate (second flow rate) of the air which is introduced into the air duct 100 and then passes through (discharged through) the air inlet/outlet flow path 130. As a result, most of the air introduced into the air duct 100 through the air inflow path 110 may be discharged through the air inlet/outlet flow path 130.

For example, the first differential pressure of the air outflow path 120 may be 50 to 80 KPa, and the second differential pressure of the air inlet/outlet flow path 130 may be several kilopascals (KPa).

For reference, the second differential pressure of the air inlet/outlet flow path 130 may be adjusted by changing the structure and shape (e.g., a straight shape or a curved shape) of the air inlet/outlet flow path 130 or by mounting other additional devices. For example, the differential pressure of the air inlet/outlet flow path 130 may increase as the air inlet/outlet flow path 130 is curved in a complicated shape or as the number of structures of the air inlet/outlet flow path 130 (the number of internal structures that come into contact with air) increases.

For reference, at least a part of the air inlet/outlet flow path 130 may be always kept opened. Therefore, the air may enter or exit (be introduced or discharged through) the air inlet/outlet flow path 130 depending on the traveling condition (the inertial traveling condition or the normal traveling condition) of the vehicle.

In the embodiment of the present disclosure illustrated and described above, the example has been described in which the second differential pressure of the air inlet/outlet flow path 130 is lower than the first differential pressure of the air outflow path 120. However, according to another embodiment of the present disclosure, the first differential pressure of the air outflow path and the second differential pressure of the air inlet/outlet flow path may be equal to each other.

The air inlet/outlet flow path 130 may have various structures through which air may pass. The present disclosure is not restricted or limited by the structure and shape of the air inlet/outlet flow path 130.

For example, the air inlet/outlet flow path 130 may be formed in an approximately straight shape. According to another embodiment of the present disclosure, the air inlet/outlet flow path may be formed in a curved shape (e.g., an "L" shape or an "S" shape).

The air inlet/outlet flow path 130 may be connected to various positions on the air duct 100 in accordance with required conditions and design specifications. The present disclosure is not restricted or limited by the position on the air duct 100 to which the air inlet/outlet flow path 130 is connected.

For example, the air inlet/outlet flow path 130 may be disposed at an upstream side from the filter member 102 (at a position below the filter member based on FIG. 2) in a direction in which the air flows from the air inflow path 110 to the air outflow path 120.

This is based on the fact that the differential pressure at the upstream side from the filter member 102 is relatively lower than the differential pressure at the downstream side from the filter member 102 where the air outflow path 120 (fuel cell stack) is connected. Since the air inlet/outlet flow path 130 is disposed at the upstream side from the filter member 102, it is possible to obtain an advantageous effect of further improving performance in allowing the air to flow through the air inlet/outlet flow path 130 while bypassing the air outflow path 120 (further improving discharge performance). Further, it is possible to obtain an advantageous effect of minimizing the amount of air to be supplied to the fuel cell stack 20 via the air outflow path 120.

According to another embodiment of the present disclosure, the air inlet/outlet flow path may be provided at the downstream side from the filter member.

In particular, the air inlet/outlet flow path 130 may face the air inflow path 110.

Since the air inlet/outlet flow path 130 faces the air inflow path 110 as described above, the air introduced through the air inflow path 110 may more effectively enter the air inlet/outlet flow path 130. Therefore, it is possible to obtain an advantageous effect of further improving the performance in allowing the air to flow through the air inlet/outlet flow path 130 while bypassing the air outflow path 120 (further improving discharge performance).

More particularly, the air inlet/outlet flow path 130 may be disposed coaxially with the air inflow path 110.

Since the air inlet/outlet flow path 130 is disposed coaxially with the air inflow path 110 as described above, most of the air introduced through the air inflow path 110 may immediately enter the air inlet/outlet flow path 130 without coming into contact with an inner surface of the air duct 100. Therefore, it is possible to obtain an advantageous effect of further improving the performance in allowing the air to flow through the air inlet/outlet flow path 130 while bypassing the air outflow path 120 (further improving discharge performance).

Figure 5:
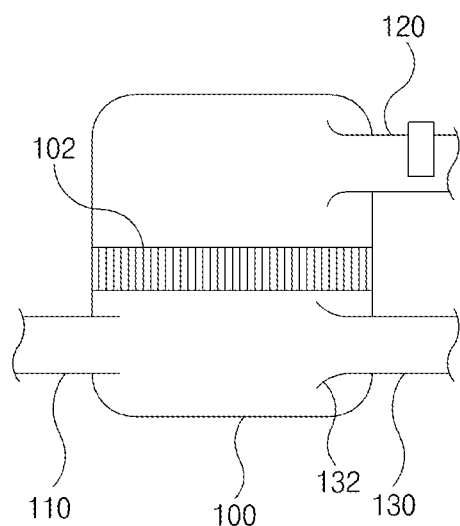
FIG. 5 is a view for explaining a guide member of the fuel cell system for a vehicle according to the embodiment of the present disclosure.

Referring to FIG. 5, according to the exemplary embodiment of the present disclosure, the air supply device may include an air guide 132 disposed at an end of the air inlet/outlet flow path 130 exposed into the air duct 100, and the air guide 132 is disposed in the air duct 100 and serves to guide the air to the air inlet/outlet flow path 130.

The air guide 132 may have various structures capable of guiding the air, which is introduced into the air duct 100 through the air inflow path 110, to the air inlet/outlet flow path 130 (inducing smooth suction). The present disclosure is not restricted or limited by the type and structure of the air guide 132.

For example, the air guide 132 may have a larger cross-sectional area than the air inlet/outlet flow path 130. For example, a bell mouth having a larger cross-sectional area than the air inlet/outlet flow path 130 may be used as the air guide 132.

Since the air guide 132 is provided at the end of the air inlet/outlet flow path 130 as described above, the air in the air duct 100 may be more effectively concentrated into the air inlet/outlet flow path 130. Therefore, it is possible to obtain an advantageous effect of further improving the performance in allowing the air to flow through the air inlet/outlet flow path 130 while bypassing the air outflow path 120 (further improving discharge performance).

Meanwhile, in the embodiment of the present disclosure illustrated and described above, the example has been described in which the air inlet/outlet flow path 130 is connected to a main body of the air duct 100. However, according to another embodiment of the present disclosure, the air inlet/outlet flow path may be connected to other portions of the air duct.

Figure 6:
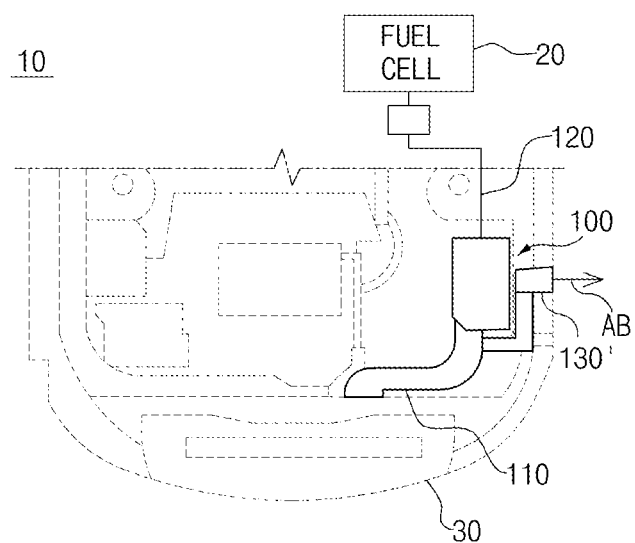
FIGS. 6 and 7 are views for explaining a modified example of an air inlet/outlet flow path of the fuel cell system for a vehicle according to the embodiment of the present disclosure.

Referring to FIG. 6, according to another embodiment of the present disclosure, an air supply divide 10 may include an air inlet/outlet flow path 130' having one end connected to the air duct 100 and the other end exposed to the outside of the air duct 100, the air inlet/outlet flow path 130' being configured to allow air to selectively enter or exit the air duct 100 depending on the operation of the fuel cell stack 20. The air inlet/outlet flow path 130' may be connected to the air inflow path 110.

In addition, in the embodiment of the present disclosure illustrated and described above, the example has been described in which the outlet of the air inlet/outlet flow path 130 is directed toward the lateral side of the vehicle 30 with respect to the direction in which the vehicle 30 travels. However, according to another embodiment of the present disclosure, the outlet of the air inlet/outlet flow path may be directed in other directions.

Figure 7:
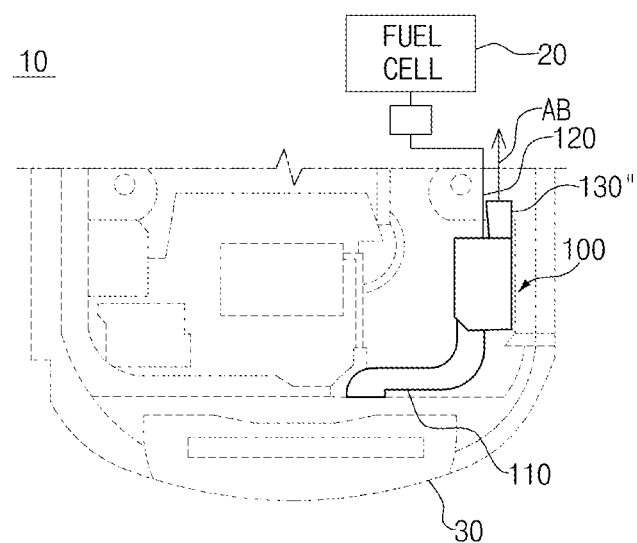

For example, referring to FIG. 7, an air supply device 10 may include an air inlet/outlet flow path 130" having one end connected to the air duct 100 and the other end exposed to the outside of the air duct 100, the air inlet/outlet flow path 130" being configured to allow air to selectively enter or exit the air duct 100 depending on the operation of the fuel cell stack 20. An outlet of the air inlet/outlet flow path 130" may be directed toward a rear side of the vehicle 30. Therefore, air AB, which flows through the air inlet/outlet flow path 130" while bypassing the air outflow path 120, may be discharged toward the rear side of the vehicle 30.

Meanwhile, the outlet of the air inlet/outlet flow path may be directed toward the front side of the vehicle. However, in a case in which the outlet of the air inlet/outlet flow path is directed toward the front side of the vehicle, air discharged through the air inlet/outlet flow path may reversely flow back into the air duct by the vehicle-induced wind introduced while the vehicle 30 travels. Therefore, the outlet of the air inlet/outlet flow path may be directed in the other directions instead of being directed toward the front side of the vehicle.

According to the embodiment of the present disclosure described above, it is possible to obtain an advantageous effect of improving safety, reliability, and operational efficiency.

In particular, according to the embodiment of the present disclosure, it is possible to obtain an advantageous effect of inhibiting surplus power generation and malfunction of the fuel cell stack caused by an inflow of vehicle-induced wind.

In addition, according to the embodiment of the present disclosure, it is possible to obtain an advantageous effect of improving durability, efficiency, safety, and reliability of the fuel cell stack.

In addition, according to the embodiment of the present disclosure, it is possible to obtain an advantageous effect of quickly supplying air to the fuel cell stack when the traveling condition of the fuel cell electric vehicle is changed.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A fuel cell system for a vehicle, the fuel cell system comprising:
   a fuel cell stack provided in a vehicle;
   an air duct comprising an air inflow path through which air is introduced, and an air outflow path through which the air is discharged to the fuel cell stack; and
   an air inlet/outlet flow path having one end connected to the air duct and the other end exposed to the outside of the air duct, the air inlet/outlet flow path being configured to allow the air to selectively enter or exit the air duct depending on an operation of the fuel cell stack,
   wherein when the vehicle travels by inertia and the operation of the fuel cell stack is stopped, the air inlet/outlet flow path discharges the air introduced through the air inflow path to the outside of the air duct, and
   wherein when the vehicle normally travels and the fuel cell stack operates, the air inlet/outlet flow path introduces the air into the air duct from the outside of the air duct.

2. The fuel cell system of claim 1, wherein the air outflow path is configured to have a first differential pressure, and the air inlet/outlet flow path is configured to have a second differential pressure lower than the first differential pressure.

3. The fuel cell system of claim 1 further comprising:
   an air guide disposed at an end of the air inlet/outlet flow path exposed into the air duct, the air guide being disposed in the air duct and configured to guide the air to the air inlet/outlet flow path.

4. The fuel cell system of claim 3, wherein the air guide has a larger cross-sectional area than the air inlet/outlet flow path.

5. The fuel cell system of claim 1 further comprising:
   a filter member disposed between the air inflow path and the air outflow path and configured to filter the air.

6. The fuel cell system of claim 5, wherein the air inlet/outlet flow path is disposed at an upstream side from the filter member.

7. The fuel cell system of claim 1, wherein the air inlet/outlet flow path faces the air inflow path.

8. The fuel cell system of claim 1, wherein the air inlet/outlet flow path is connected to the air inflow path.

9. The fuel cell system of claim 1, wherein an outlet of the air inlet/outlet flow path is directed toward a lateral or rear side of the vehicle.

10. An air supply device configured to supply air to a fuel cell stack of a vehicle, the air supply device comprising:
an air duct comprising an air inflow path through which the air is introduced, and an air outflow path through which the air is discharged to the fuel cell stack; and
an air inlet/outlet flow path having one end connected to the air duct and the other end exposed to the outside of the air duct, the air inlet/outlet flow path being configured to allow the air to selectively enter or exit the air duct depending on an operation of the fuel cell stack,
wherein when the vehicle travels by inertia and the operation of the fuel cell stack is stopped, the air inlet/outlet flow path discharges the air introduced through the air inflow path to the outside of the air duct, and
wherein when the vehicle normally travels and the fuel cell stack operates, the air inlet/outlet flow path introduces the air into the air duct from the outside of the air duct.

11. The air supply device of claim 10, wherein the air outflow path is configured to have a first differential pressure, and the air inlet/outlet flow path is configured to have a second differential pressure lower than the first differential pressure.

12. The air supply device of claim 10 further comprising:
an air guide disposed at an end of the air inlet/outlet flow path exposed into the air duct, the air guide being disposed in the air duct and configured to guide the air to the air inlet/outlet flow path.

13. The air supply device of claim 12, wherein the air guide has a larger cross-sectional area than the air inlet/outlet flow path.

14. The air supply device of claim 10 further comprising:
a filter member disposed between the air inflow path and the air outflow path and configured to filter the air.

15. The air supply device of claim 14, wherein the air inlet/outlet flow path is disposed at an upstream side from the filter member.

16. The air supply device of claim 10, wherein the air inlet/outlet flow path faces the air inflow path.

17. The air supply device of claim 10, wherein the air inlet/outlet flow path is connected to the air inflow path.

18. The air supply device of claim 10, wherein an outlet of the air inlet/outlet flow path is directed toward a lateral or rear side of the vehicle.

* * * * *